(12) United States Patent
Danilov et al.

(10) Patent No.: US 11,347,416 B1
(45) Date of Patent: May 31, 2022

(54) COMPACTING DATA STREAMS IN A STREAMING DATA STORAGE PLATFORM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 29 days.

(21) Appl. No.: 17/143,500

(22) Filed: Jan. 7, 2021

(51) Int. Cl.
*G06F 3/06* (2006.01)

(52) U.S. Cl.
CPC .......... *G06F 3/0635* (2013.01); *G06F 3/0604* (2013.01); *G06F 3/067* (2013.01); *G06F 3/0659* (2013.01)

(58) Field of Classification Search
CPC .... G06F 3/0635; G06F 3/0604; G06F 3/0659; G06F 3/067
See application file for complete search history.

(56) References Cited

U.S. PATENT DOCUMENTS

| | | | | |
|---|---|---|---|---|
| 8,868,518 B2* | 10/2014 | Andrade | ........... | G06F 16/24568 707/694 |
| 9,282,114 B1* | 3/2016 | Dotan | ........... | H04L 63/1441 |
| 10,320,813 B1* | 6/2019 | Ahmed | ........... | H04L 63/1416 |
| 10,459,849 B1* | 10/2019 | Shorb | ........... | G06F 11/2041 |
| 11,163,484 B1* | 11/2021 | Kaitchuck | ........... | G06F 3/061 |
| 11,164,090 B1* | 11/2021 | Pautet | ........... | G06F 9/542 |
| 11,281,643 B2* | 3/2022 | Hsiao | ........... | G06F 16/24568 |
| 2010/0268808 A1* | 10/2010 | Chkodrov | ........... | G06F 11/3447 709/223 |
| 2015/0154524 A1* | 6/2015 | Borodow | ........... | H04W 4/029 705/7.23 |
| 2016/0071026 A1* | 3/2016 | Brand | ........... | G06N 20/00 706/12 |
| 2016/0127517 A1* | 5/2016 | Shcherbakov | ........... | H04L 67/10 709/217 |
| 2017/0235424 A1* | 8/2017 | De Araujo | ........... | G06F 3/0488 345/173 |
| 2019/0295018 A1* | 9/2019 | Borodow | ........... | H04M 15/84 |
| 2019/0303385 A1* | 10/2019 | Ching | ........... | G06F 16/26 |
| 2022/0028396 A1* | 1/2022 | Li | ........... | G10L 15/26 |
| 2022/0050712 A1* | 2/2022 | Oliveirinha | ........... | G06F 9/542 |

* cited by examiner

*Primary Examiner* — Nicholas J Simonetti
(74) *Attorney, Agent, or Firm* — Amin, Turocy & Watson, LLP

(57) ABSTRACT

The described technology is generally directed towards a streaming data storage system that compacts older stream data by aggregating that data based on an aggregation function, and replacing the older data with the aggregated data. The technology works with a data stream in different storage tiers (e.g., Tier-1 and Tier-2), provides consistent data stream compaction of data streams having multiple segments, works with different reader applications at different event positons in the data stream, and allows the use of multiple, different aggregation functions. The technology facilitates more efficient compaction for a data stream with a lesser number of routing keys by maintaining per-chunk aggregated data for such data streams.

20 Claims, 16 Drawing Sheets

COMPACTING DATA STREAMS IN A STREAMING DATA STORAGE PLATFORM

TECHNICAL FIELD

The subject application relates generally to data storage, and, for example, to a technology that compacts data streams in storage systems that implement data streams for storing and serving continuous and unbounded data, and related embodiments.

BACKGROUND

Contemporary data storage systems, such as DELL EMC's streaming data storage platform using the PRAVEGA data storage system, store data in a storage abstraction referred to as a stream. A stream is identified with a name, and can store continuous and potentially unbounded data; more particularly, a stream comprises a durable, elastic, append-only, sequence of stored events, with newer events appended to the tail of a stream. Each event is stored per routing key associated with that event, where the routing key for example can be a named entity such as an identifier of a device that generated the event data, e.g., a device named sensor1234 generates an event with data of 7 appended to a segment of the data stream based on a hash of that (routing key, data value) pairing ("sensor1234", 7).

Although a stream is potentially unbounded, storage resources are finite. PRAVEGA implements an automatic data expiration feature to cut a data stream short from the head of the data stream and thereby reduce the storage footprint of the stream. However, such an automatic data expiration feature may break the semantics of stream data.

By way of example, consider that a stream processing program reads events per routing key and sums their values to produce a result; for example if there are two events appended to a stream corresponding to two (routing key, event) pairs such as ("sensor1234", 7) and ("sensor1234", 4), the stream processing program for routing key "sensor1234" should return a value of 11 (7+4=11). If however the stream is cut short and the earlier-appended event with value of 7 is removed, then only the event with the value of 4 remains stored for this routing key, whereby a subsequent rescan of the stream by that program unexpectedly returns 4 for the "sensor1234" routing key.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
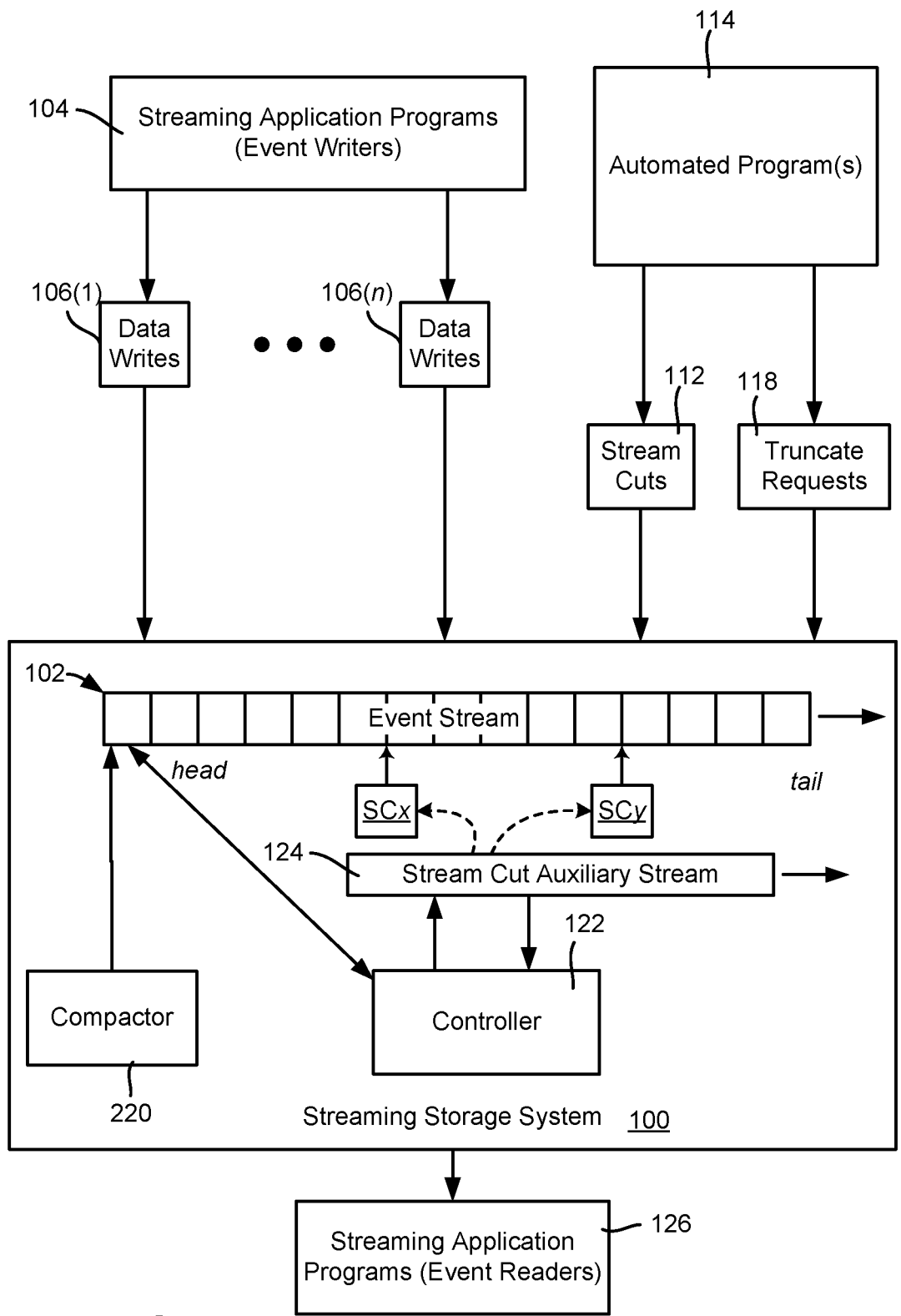
FIG. 1 is a block diagram representation of example components and data-related operations in a streaming data storage system in which a data stream is compacted, in accordance with various aspects and implementations of the subject disclosure

Various aspects of the technology described herein are generally directed towards reducing the footprint of a stream without breaking the semantics of the stream data. When implemented as described herein, the technology operates to perform stream compaction, that is, by processing data in a way that aggregates data from the head of a data stream, per routing key, to produce a compacted data stream. As will be understood, the technology performs such stream compaction as a streaming data storage system feature that maintains stream semantics, and does so without creating any additional application-visible data structure(s) that have to be maintained or accessed by an application in conjunction with reading a related data stream.

In one aspect, the technology operates to replace a larger amount of old stream data with a smaller amount of aggregated data, where the aggregated data preserves the semantics of the old data that the aggregated data replaces. To this end, a compactor component (e.g., a process) reads data from the head of a stream until a specified or predetermined tail part is reached, aggregates the read data with existing data according to a defined/specified aggregation function (e.g., a summing function), and outputs the aggregated data to the storage backend in the native stream format, replacing the stream data that the compactor has read. This can be done for any number of different routing keys in a single compaction operation, and can be done with a stream having multiple segments. The source data from which the aggregated data was obtained from the stream head can be deleted/truncated, such as when no longer needed by any reader application.

It should be understood that any of the examples herein are non-limiting. For instance, some of the examples are based on PRAVEGA data storage technology; however virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes an event stream 102 comprising a data stream of events, with new events appended to the tail, such that the data stream 102 grows from a head towards a tail direction. A data stream such as the data stream 102 is typically maintained with its older events in Tier-2 storage and its newer events in Tier-1 storage to facilitate better relative processing performance.

In general, event writers such as one or more streaming application programs 104 send data writes (events) 106(1)-106(n) to the streaming data storage system 100 (e.g., via an API of in the system 100) for appending to the event stream 102. Note that with respect to event writers, the processing and handling of appends are unchanged (e.g., in the PRAVEGA platform) with respect to supporting stream applications as described herein.

Note that for simplicity, FIG. 1 does not illustrate the concept of stream data segments. However, it is noted that a stream may be split into a stream segments (or simply segments), which act as logical containers for events within the stream. When a new event is written to a stream with segments, the new event is stored to one of the segments based on the event's routing key, e.g., based on consistent hashing of the event's routing key to assign the event to a segment, in which the consistent hashing of the full set of events' routing keys forms a "key space" that is divided into a number of partitions, corresponding to the number of segments. Note that the number of parallel segments in a stream can automatically increase and decrease over time based on the I/O load the stream receives, which can be referred to as automatic scaling.

A stream can be truncated from an event boundary, which is specified using a stream cut. Stream cuts 112 can be created automatically, such as periodically or on demand, by automated program(s) 114 or the like. The automated program(s) 114 can also send compaction requests 118, such as when the stream reaches a size capacity limit, for handling by a compactor 120 as described herein. A controller 122 manages application-based stream cuts, which in one implementation is performed by maintaining a stream cut auxiliary stream 124.

Streaming application programs, referred to herein as event readers 126, read events from the data stream 102, (e.g., via an API of in the system 100). As described herein, there can be different types of readers, and readers can be in different locations within the stream 102 with respect to reading the events therein.

Figure 2:
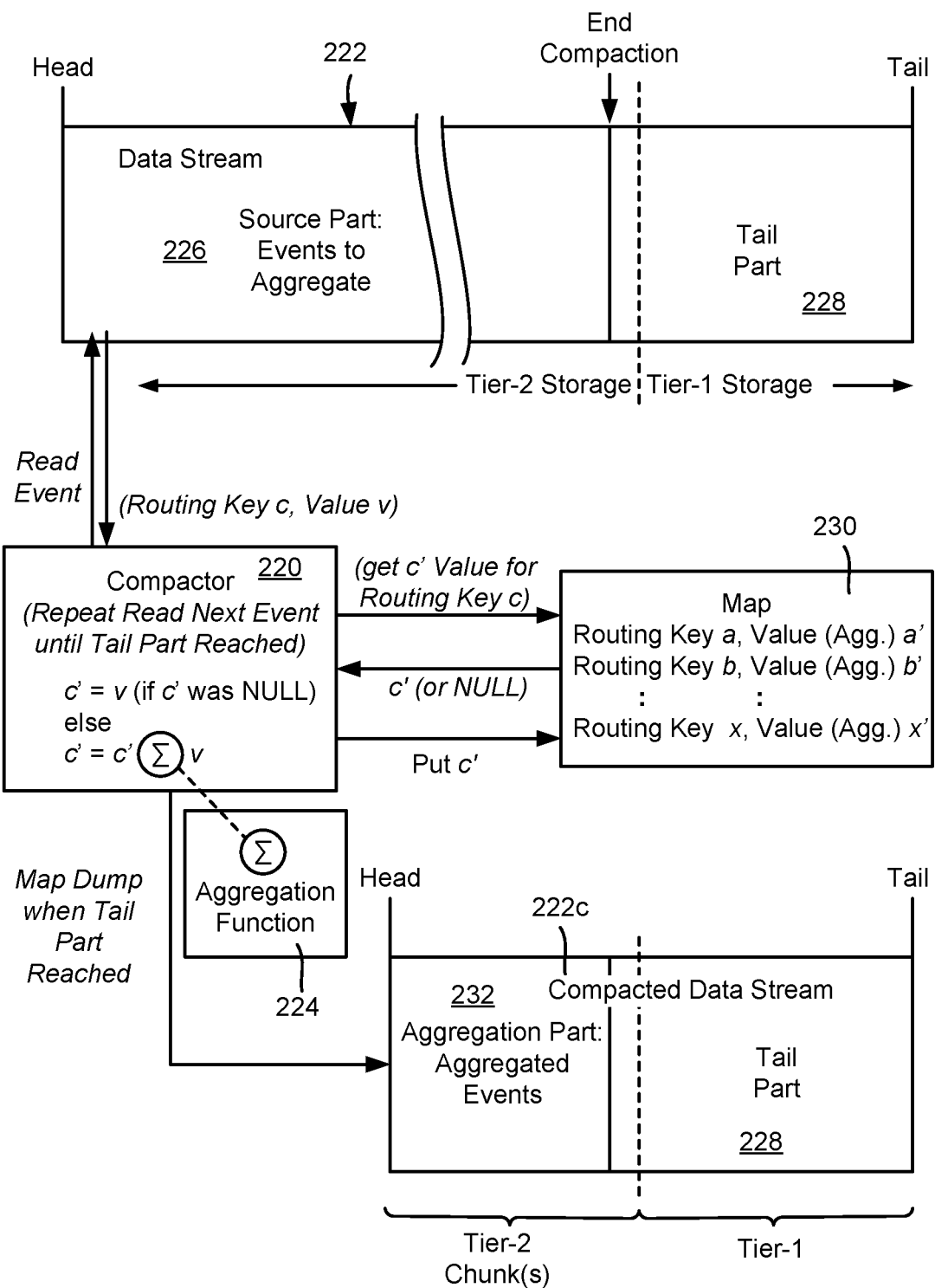
FIG. 2 is a block diagram representation of example components and data-related operations that compact a source part of a data stream into an aggregation part of the data stream to provide a compacted data stream, in accordance with various aspects and implementations of the subject disclosure.

Turning to aspects related to compaction of a stream as described herein, FIG. 2 shows an implementation of stream compaction component (e.g. a process) referred to as a compactor 220 that compacts a data stream 222 based on aggregating the older event data values of the data stream 222. Aggregation is per routing key, that is, during compaction events with the same routing key are combined into an aggregated event for that routing key. The logic of the compactor 220 can be implemented in a background system process that runs periodically and/or on demand, such as on demand when the stream size exceeds a predefined threshold size, as it is not always practical to keep an entire data stream, which can have an extremely large footprint.

As will be understood, compaction by data aggregation can be based on any aggregation function 224 that combines one or more data values associated with the same routing key into a single updated aggregated event (or at least lesser number of events) relative to the events before compaction. As described herein (e.g., with reference to FIG. 6), there can be multiple, different aggregation functions for the same data stream, corresponding to multiple, different aggregation parts of the data stream.

When compacting the data stream 222, the compactor 220 reads the stream's events starting from the stream head (the oldest events), which are in a source part 226 of the data stream 222. Note that ordinarily the compactor 220 does not compact the whole data stream 220, as some practical number of recent events are normally left intact to support real-time processing. Thus, compaction ends when the compactor 220 reaches such a compacting stopping point in the data stream, that is, reaches a portion of the stream to keep non-compacted, referred to herein as the tail part 228, and as represented in FIG. 2 by the "End Compaction" arrow.

Note that in FIG. 2, the dashed line with respect to the data stream 222 indicates a separation between Tier-1 storage and Tier-2 storage in which most of the tail part 228 is in Tier-1 storage, with the oldest part of the tail part 228 in Tier-2 storage, along with the entire source part 222. However, FIG. 2 illustrates only one possible scenario, as alternatively the entire tail part 228 can be in Tier-1 storage, with the source part 226 of the stream partially in Tier-2 storage (in a first part thereof) and partially in Tier-1 storage (in a second part thereof). It is feasible for the source part 226 of the data stream 222 to be entirely in Tier-2 storage and the tail part 228 entirely in Tier-1 storage.

When the compactor 220 processes a data stream that has been previously compacted at least once, the first events the compactor 220 reads are events with previously aggregated data. In other words, if the data stream has been previously compacted, the existing data events in a source part of the data stream are combined with their counterpart, previously aggregated events to provide the updated aggregated events as described herein.

To perform compaction of the source part, in one implementation the compactor maintains a data structure, such as a key-value map 230 for the aggregated stream data. For each event comprising a routing key and data value read from the source part 226, the compactor 220 uses the routing key as an index to the map 230 to obtain the existing aggregated value for the routing key (if any exists), combines (based on the defined/specified aggregation function) the existing, previous aggregated value with the data value of the event just read into an updated aggregated value, and puts the updated aggregated value back into the map 230 in place of the previous aggregated value. If there is no existing aggregated value for the routing key, the data value read from the source part 226 is used as the basis for the initial updated aggregated value.

By way of example, if the defined/specified aggregation function 224 to use is a summation function, and there is an existing aggregated value for the routing key, the data value of the event just read is summed with the existing aggregated value and put into the data structure 230 as an updated aggregated value (that overwrites the existing aggregated value). If there was no previously existing aggregated value for the routing key, the data value of the event just read becomes the updated aggregated value (as if summed with zero in this example).

By way of another example, if alternatively the aggregation function squares the data value of the event just read before summing with the existing aggregated value, then the updated aggregated value is the square of the data value of the event just read plus the existing aggregated value. However, if no previous existing aggregated value was in the map, the square of the data value of the event just read becomes the initial existing aggregated value for this routing key.

Once the compactor 220 reaches the tail part of the stream, the compactor 220 dumps the map contents 230 to the storage backend in the native stream format, replacing the source stream data 226 the compactor has read. This forms a new, compacted data stream 222c from the perspective of a reader application that may need to go back and reread the stream from its head, which has moved closer to the start of the tail part because the overall amount of stream data has been compacted. In general, compaction thus replaces a large amount of old stream data with a considerably smaller amount of aggregated data, where the aggregated data preserves the semantics of the old data it replaces. Note that following compaction, the tail part 228 of the compacted stream 222c remains unchanged, although the tail part can grow as new events are appended to the data stream, including during compaction.

Note that because d the aggregated data represent old stream data, it is normally beneficial to dump the aggregated data directly to Tier-2 storage, e.g., as a sequence of chunk data structures. The data storage system (e.g., corresponding to PRAVEGA) seamlessly connects the stream's aggregated data and the stream's tail part. It is feasible for the data storage system to provide applications with information about actual data type (raw or aggregated) and/or location (Tier-1 or Tier-2), so the applications can choose to tradeoff resource consumption and result accuracy. As there is one aggregated value per routing key, the order in which aggregated data is stored is irrelevant, as stream platforms only guarantees that events with the same routing key are consumed in the order they were written, and does not guarantee cross routing key ordering.

Figure 3:
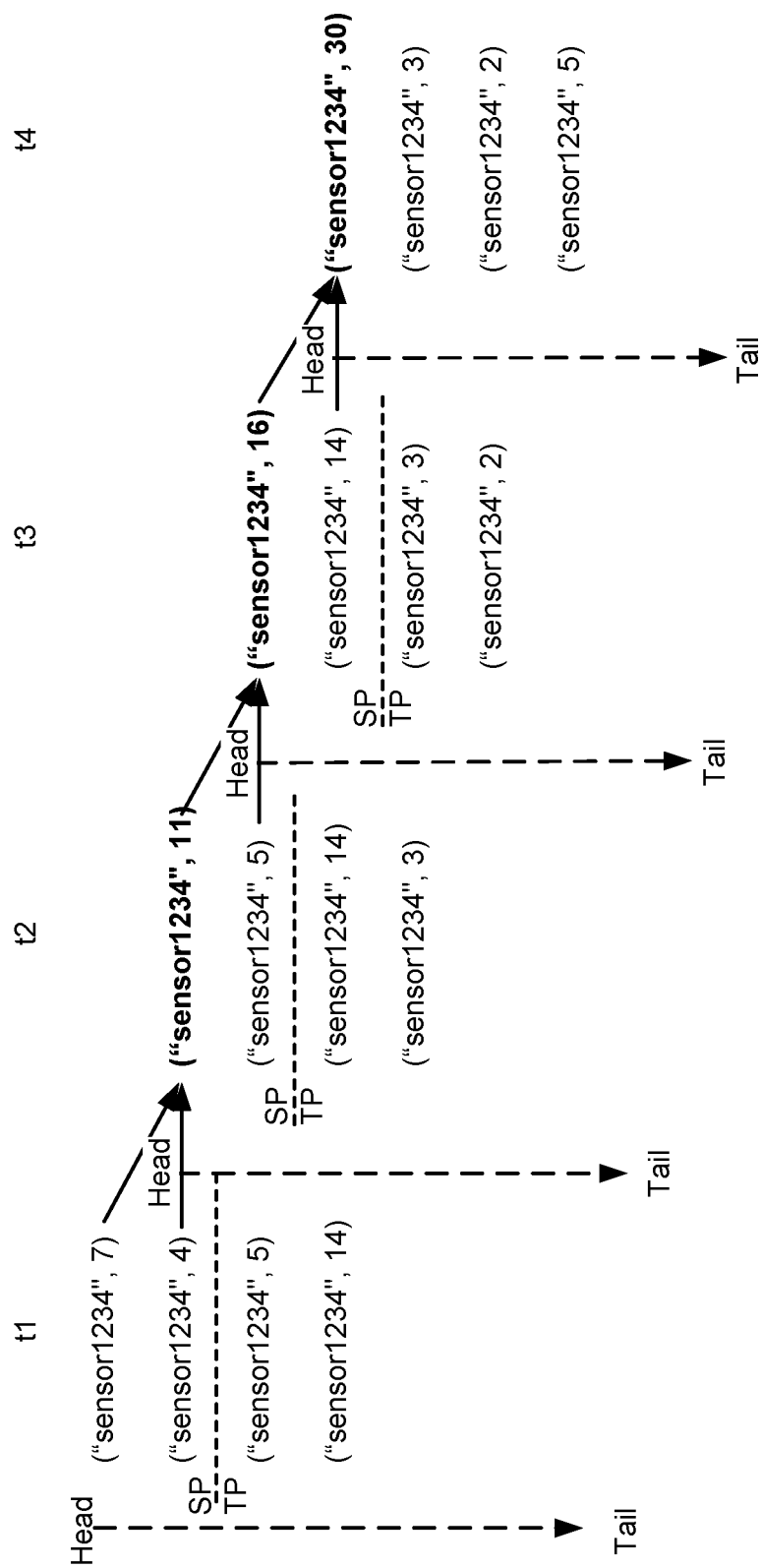
FIG. 3 is a representation of how data stream compaction works with respect to an example routing key and data values over time aggregated via a summing function, in accordance with various aspects and implementations of the subject disclosure.

FIG. 3 shows an example of compaction operations over time (from times t1-t4) in which the compactor aggregates the data in a data stream using a summing function. In FIG. 3, the dashed lines between the labels "SP" and "TP" differentiate between the source part and the tail part at each time with respect to the events of the "sensor1234" routing key.

At the moment t1, the stream contains four events with the routing key "sensor1234". By the moment t2, the stream has had another routing key "sensor1234" event (with data value 3) appended thereto, and the first two events were compacted (at the time of compaction, the last two events ("sensor1234", 5) and ("sensor1234", 14) were in the tail part and left intact). During the compaction before time t2, the original events with values 7 and 4 were compacted (summed to a value of 11), whereby a synthetic event with the aggregated value 11 (7+4) replaced the two events. Similar operations have been performed by the moments t3 and t4.

As can be seen, a stream processing (reader) application that sums the values per sensor returns 30 for "sensor1234" at the moment t1. After the three compaction operations, at the moment t4, the application still return 30 corresponding to the tail position the stream had at the moment t1. Thus, there is one stream for that stream processing (reader) application, with no additional public data structures that need to be processed, and the stream contains data for consistent reporting by the application. Therefore, from the perspective of the application, the semantics of the stream data has not been broken.

Turning to another aspect, note that PRAVEGA supports batch mode and real-time data analytics. This means that while some stream processing applications work with the tail part of the stream only, there may other stream processing applications that still need to read from the source stream part (the stream part to be compacted/that was compacted). As a result, returning to FIG. 2, it should be noted that the source part 226 may remain in storage for reader applications that have not yet reached the tail part 228 during their stream reading/processing, (which is more desirable than forcing such applications to restart with the compacted stream). At some time however, the storage space used by the source part can be reclaimed when no longer needed by any reader.

Figure 4:
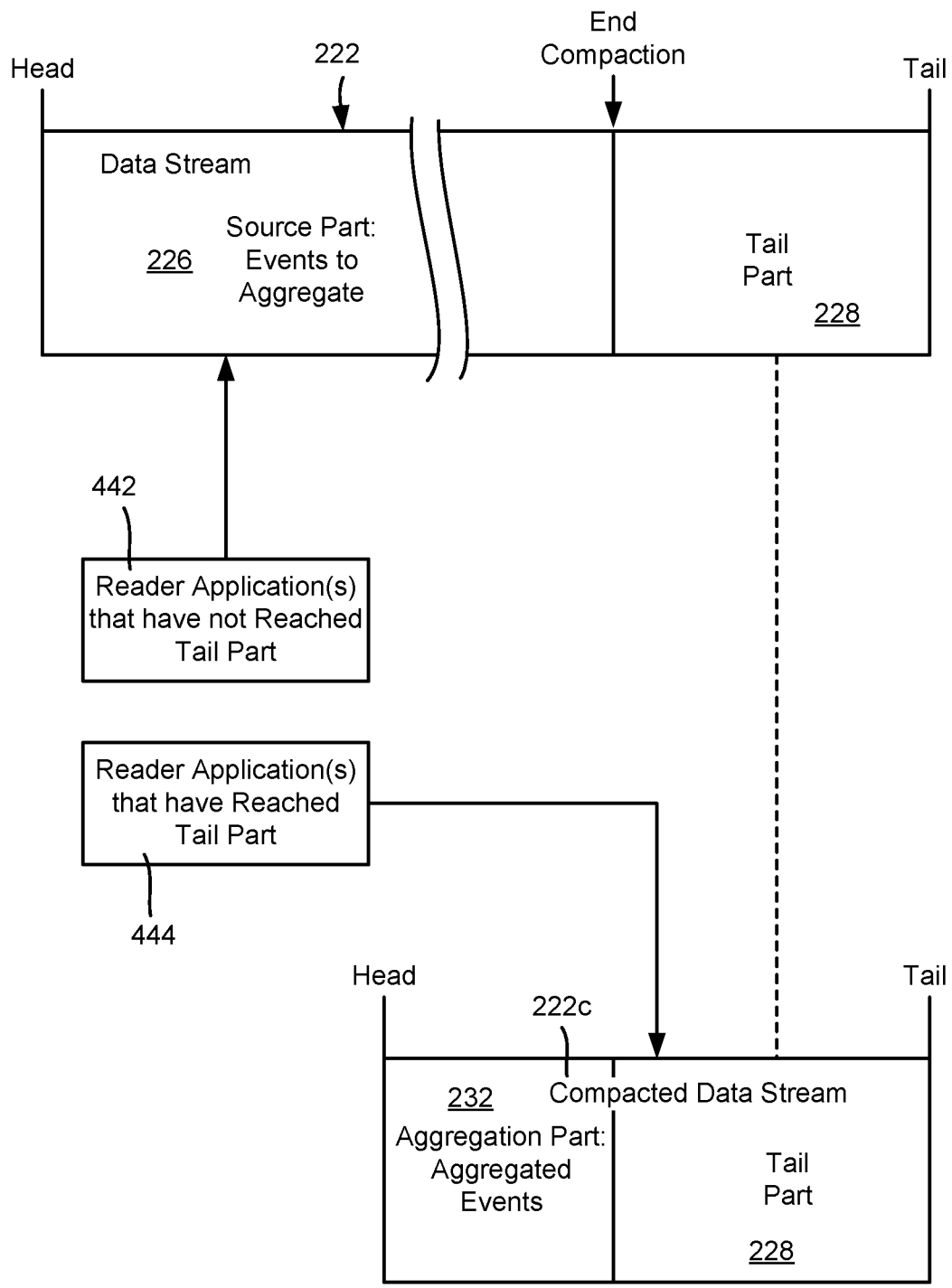
FIG. 4 is a block diagram representation showing how different reader application can read from a data stream or a compacted version of the data stream, in accordance with various aspects and implementations of the subject disclosure.

FIG. 4 shows this aspect, in which the source part 226 remains for reader applications 442 that have not reached the tail part 228 (note that there is only one tail part 228 actually maintained in storage, although two are depicted in FIGS. 2 and 4 to show the concept of two different streams from the perspective of different reader applications). Note that stream processing applications (readers/reader groups) register themselves against the data streams with which they work, and thus the data storage system is aware of each application's progress within their stream(s).

Reader applications 444 that have reached the tail part 228 will read from the compacted stream 222c, including if they need to go back and read from the head of the stream and read from the aggregation part 232. Reader applications that start reading stream data from the stream head will read from the compacted version of the stream 222c. As can be seen in FIG. 4, until there are no readers that need the source part 226, the data stream has two different heads during this (typically short) time. The context data that are maintained per application can each maintain a reference to the version of the application's stream. The compactor or another entity can delete/garbage-collect stream data that belongs only to unreferenced versions of the stream.

Figure 5:
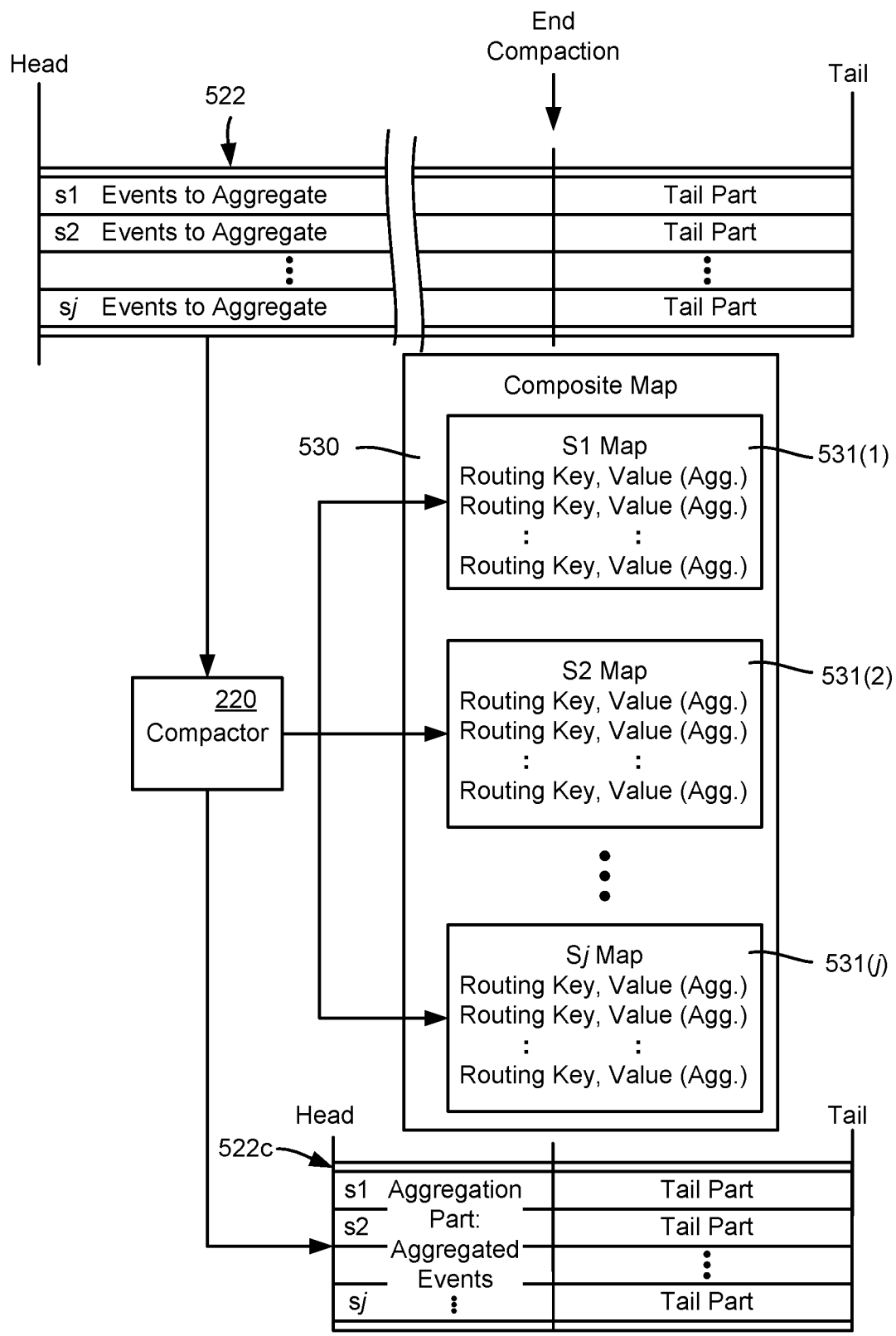
FIG. 5 is a block diagram representation depicting compaction of a data stream with multiple segments, in accordance with various aspects and implementations of the subject disclosure.

Turning to another aspect, as represented in FIG. 5, the map used by the compactor 220 can be a composite map 530 for a multiple segment stream 522, where per-segment (typically smaller) maps 531(1)-531(j) store the aggregated data for their respective segments s1-sj. Note that a hash of the routing key determines which segment the event is stored, and similarly can be used to determine each segment map's routing keys. When the tail part is reached for the multiple segment stream, the compactor 220 dumps the aggregated data to multiple segments in the compacted data stream 522c, preserving the structure of the stream segments.

Figure 6:
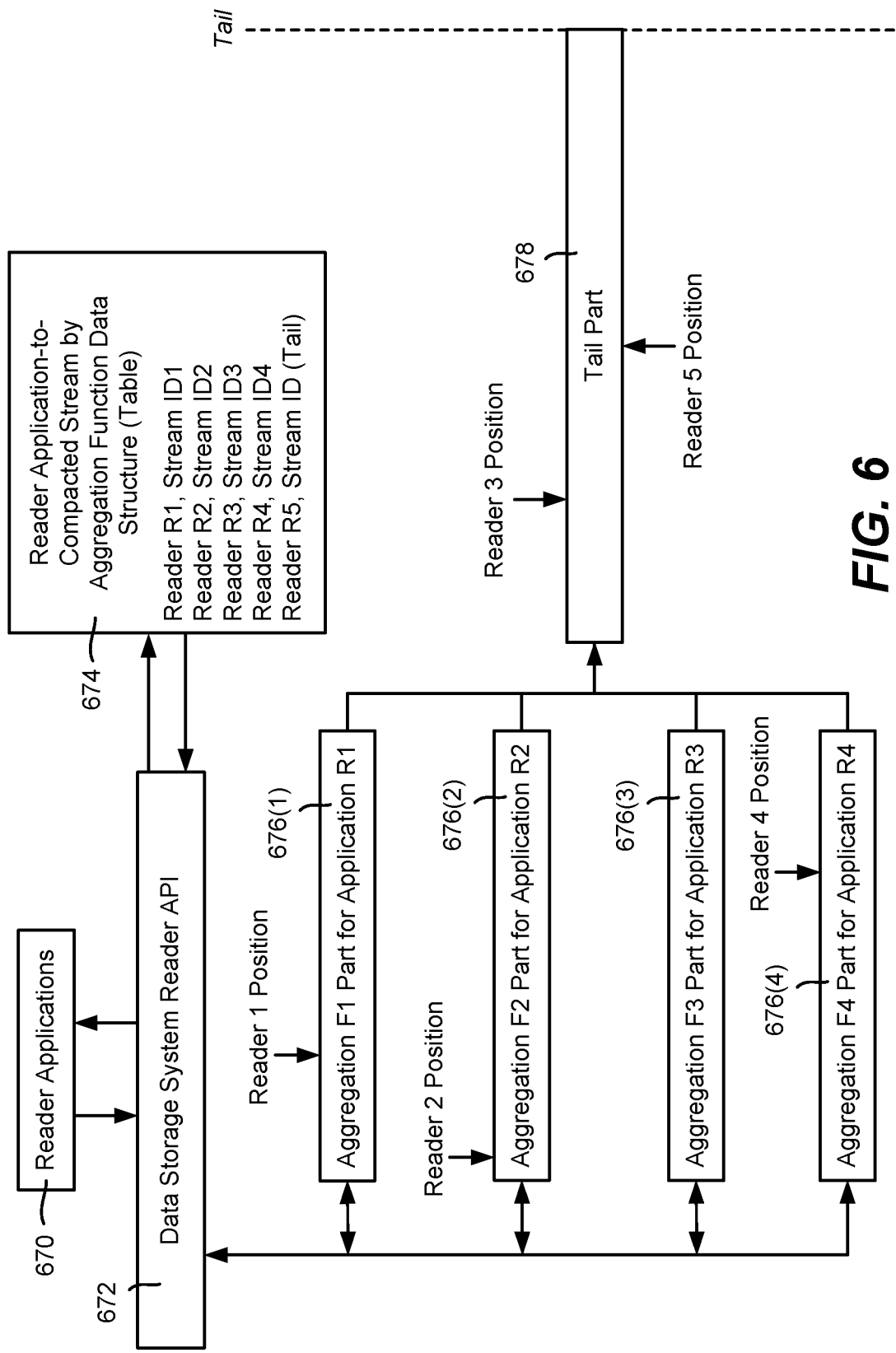
FIG. 6 is a block diagram representation depicting compaction of a data stream with multiple aggregation functions corresponding to different reader applications, in accordance with various aspects and implementations of the subject disclosure.

FIG. 6 represents another aspect, namely support for multiple different aggregation functions for compacting a data stream, such that different readers get the results they expect. By way of example, consider that one aggregation function sums each value read in during compaction with the existing value (updated aggregated value equals read-in value plus existing aggregated value), while another aggregation function squares the value of each event read in, and then adds the squared result to the previous value (updated aggregated value equals read-in value squared plus existing aggregated value). Note that there can be predefined aggregation algorithms as well as custom data aggregation logic.

FIG. 6 shows reader applications 670 that read in data via a data storage system reader API 672 or the like. The data storage system reader API 672 maintains in a suitable data structure 674 (e.g., as part of the per-reader context) the relationship between reader applications and their respective aggregation functions, if any, whereby each reader (R1-R5) gets the results it expects if reading back from a compacted data stream.

During compaction, the compactor creates a new head and a head (aggregated) part of the stream for each aggregation function. Via the data structure 674, each application still sees a stream with one head.

In the example of FIG. 6, a data stream has four different heads corresponding to four different aggregation parts 676(1)-676(4), with a respective part (corresponding to a stream ID) for each different aggregation function F1-F4/ reader applications R1-R4, respectively. As can be seen, reader application R1 will read from aggregation part 676(1), reader application R2 will read from aggregation part 676(2), and so on.

Applications that expect ordinary data expiration normally see only the tail part 678 of the stream. For example, in FIG. 6, the reader application R5 does not need to go back to the stream head, and thus is reading from the tail part and is not registered to read/process events from any aggregated part.

Note that with multiple different aggregation functions, the maps the compactor will need to use, one per aggregation function, can be too large to be practical. In this situation, the compactor may need to run multiple times for one stream, such as one run for each aggregation function. However in other situations, such as if a data stream has relatively few routing keys, the compactor can run once and update multiple maps, one map for each aggregation function.

Turning to another aspect, normally all or most of the stream data to be compacted resides in Tier-2 storage, and the amount of this data can be considerable. In some scenarios, this data needs to be read back into Tier-1 to be aggregated, which in general is undesirable. However, described herein is an optimization that significantly reduces the amount of data processed using Tier-1 storage.

In one implementation, the data stream to be compacted is monitored to determine the number of unique routing keys, as the number corresponds to the map size (or maps' sizes if there is more than one aggregation function). If the number of unique routing keys in a stream is small, described herein is keeping small, per-chunk key-value maps representing the data aggregated for individual chunks.

Figure 7:
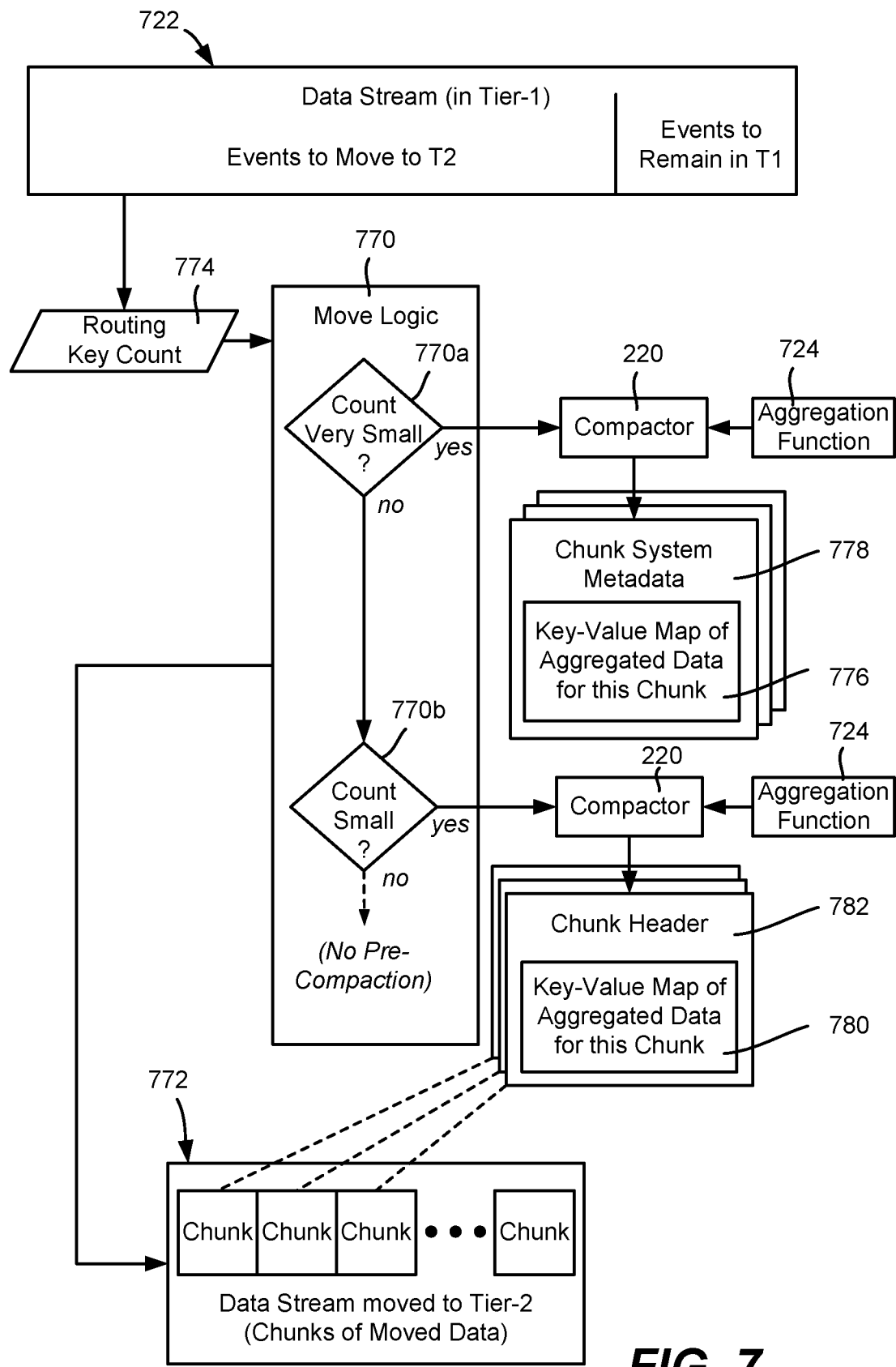
FIG. 7 is a block diagram representation showing how aggregation information (e.g., per-chunk) can be associated with a data stream when moving stream data from tier-1 to tier-2 storage, in accordance with various aspects and implementations of the subject disclosure.

As shown in FIG. 7, at some time the older events of a data stream 722 in Tier-1 storage are moved to Tier-2 storage, e.g., moved by move logic 770 into data chunks 772. Each of these data chunks 772 can be created as needed.

If as detected by the move logic 770 at decision block 770(a) the count of unique routing keys 774 in the stream 722 is very small (for purposes of simplicity in this example, consider that there is only one aggregation function and thus only one map) the key-value map is thus very small, the (very small) map can be built based on the data to be moved into the current chunk being aggregated by the compactor 220 during chunk creation, while the data is still available in Tier-1 storage. When the map is very small, the map 776 can be stored as a part of that chunk's system metadata 778, which is maintained in Tier-1 storage. The corresponding data in its original (non-compacted) form is then moved into the chunk created for that data.

If the count of unique routing keys 774 is not very small, yet still small as detected by the move logic 770 at decision block 770(b), the key-value map is thus small. The small map is built in the same way, that is, built based on the data to be moved into the current chunk being aggregated by the compactor 220 during chunk creation, while the data is still available in Tier-1 storage. When the map 780 is small (but not very small), the map 780 can be stored as a part of the chunk header 782, which is a part of the chunk (in Tier-2 storage). The corresponding data in its original (non-compacted) form is then moved into the chunk created for that data.

If the count of unique routing keys 774 is not sufficiently small, meaning that the map will be large, the stream data with many routing keys is moved from Tier-1 storage to Tier-2 chunks, and sometime later compacted as described herein.

During compaction, the compactor looks to see if a chunk already has an associated map. If so, the compactor need not again compact the chunk's data, and instead merges the existing aggregation/compaction map with the compactor's main compaction map. When the compactor reaches another chunk to be processed, the process gets the chunk's small map with aggregated data and again merges it into the compactor's main map, and so on. In the scenario wherein the chunks' maps reside in the chunk's system metadata, the compactor thus processes the chunk without needing to read any data from Tier-2 storage, which is extremely efficient. In the scenario wherein the chunks' maps are stored in their respective chunk headers, the compactor only reads this part of the chunk headers, whereby the compactor can process the chunks without reading actual chunk data, which is considerably more efficient than having to read the chunks back into Tier-1 storage, and then read the chunk data for compaction.

Figure 8:
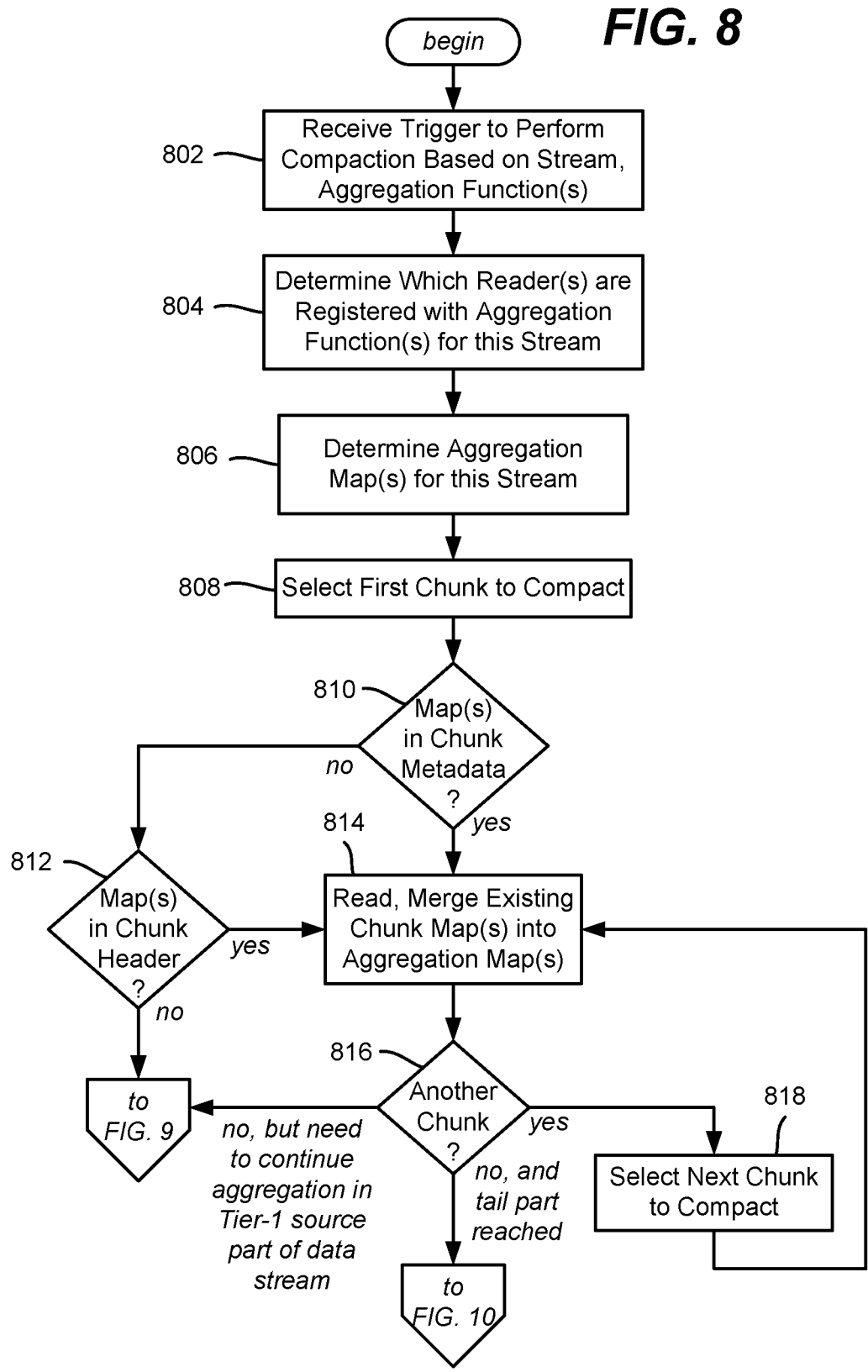
FIGS. 8-10 comprise a flow diagram showing example operations of related to compaction of a data stream via aggregated data, in accordance with various aspects and implementations of the subject disclosure.
Figure 9:
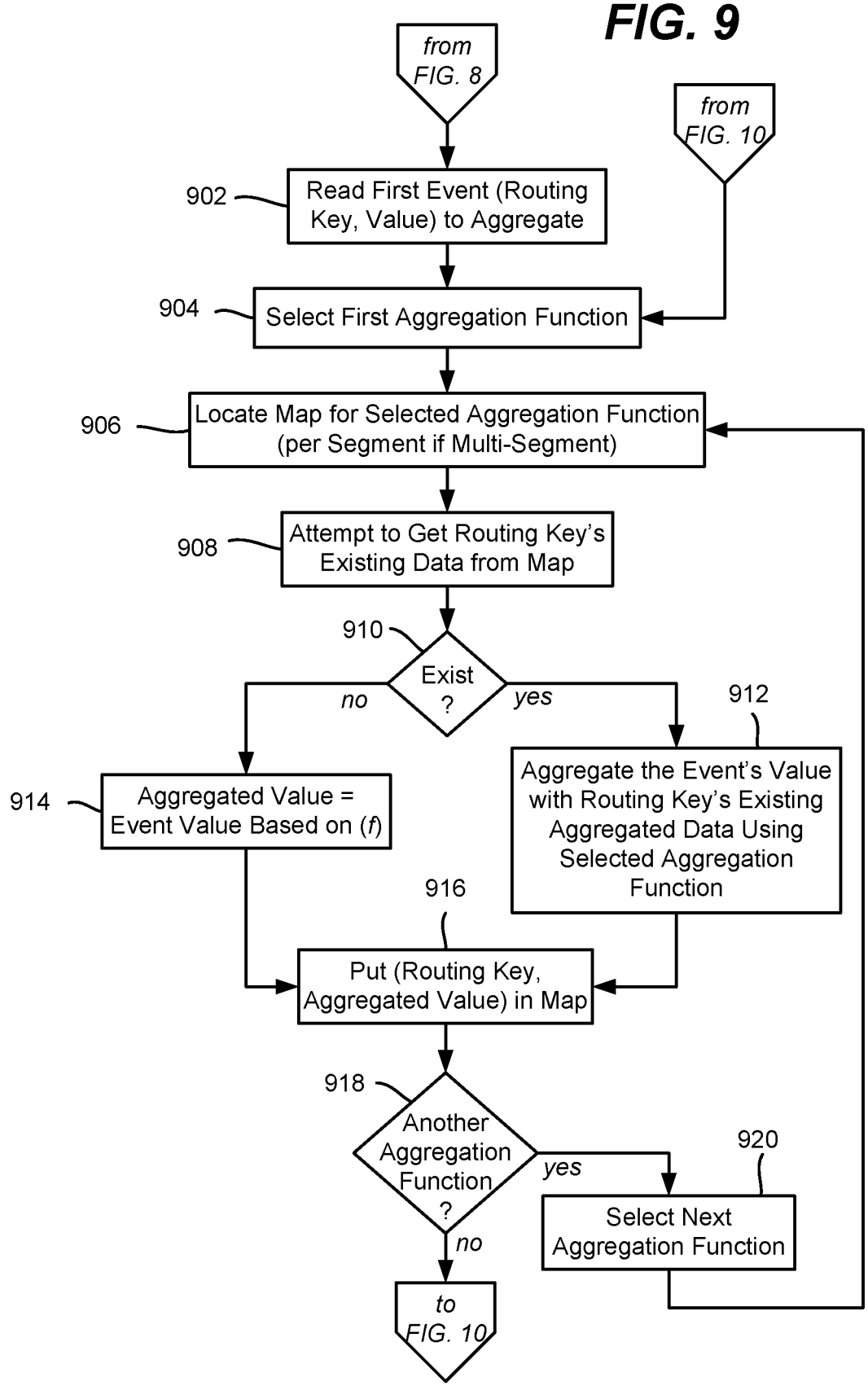
Figure 10:
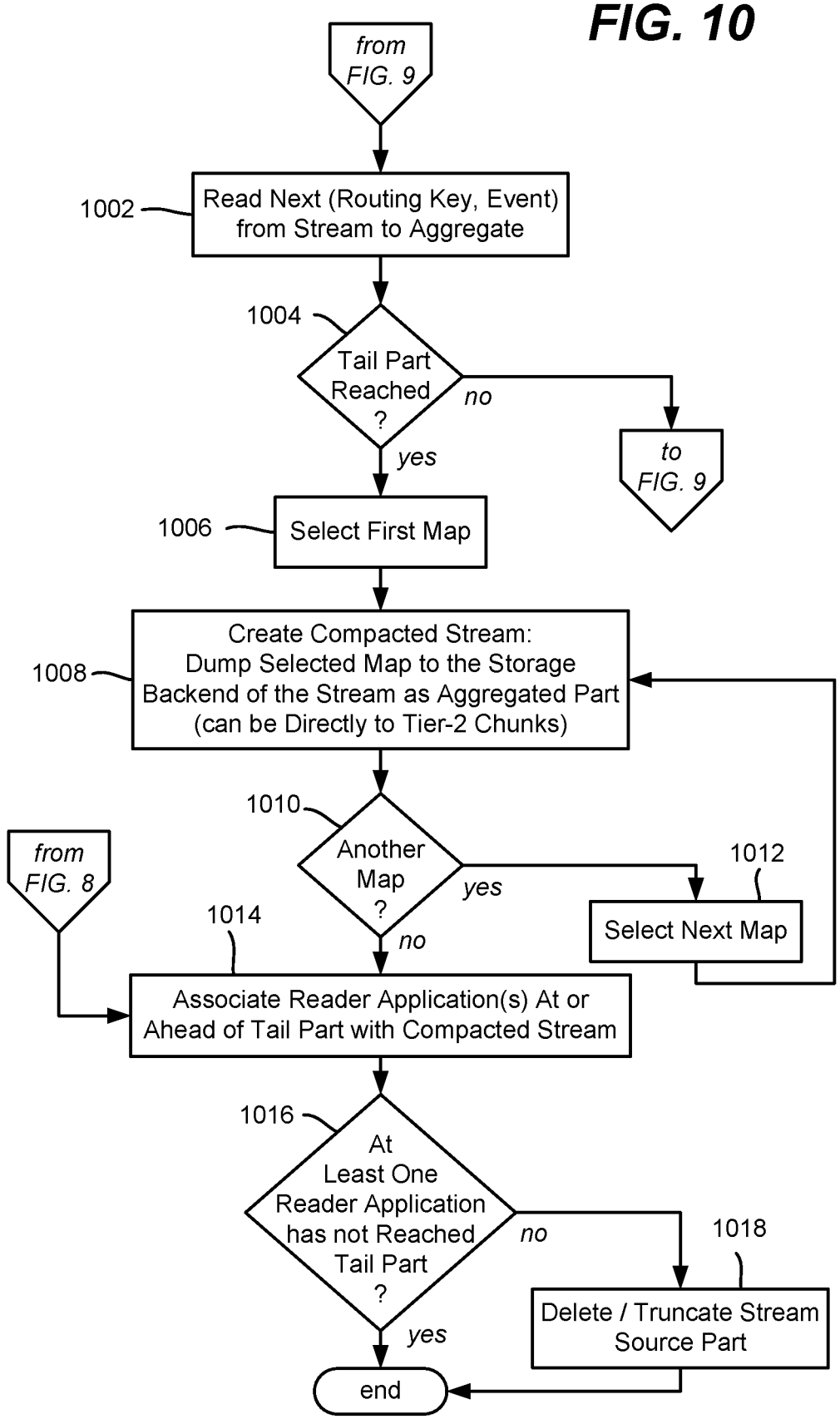

FIGS. 8-10 comprise a flow diagram showing example operations related to data stream compaction, beginning at operation 802 of FIG. 8 where compaction is triggered, e.g., periodically, based on data stream size, or otherwise. Operation 804 determines which readers are registered with aggregation functions for this stream, e.g., so that the correct aggregation function or functions are used during compaction.

Operation 806 determines the aggregation map(s) for this data stream, allocating one per aggregation function, each of which can be a composite map for a stream with multiple segments as described herein. Note that as described above, if there are multiple aggregation functions and the space needed for the maps is too large, the multiple compaction runs can be performed.

Operation 808 selects the first chunk to compact. Note that it is possible to compact directly from Tier-1 storage, however this is an unlikely scenario, and thus the examples of FIGS. 8-10 are described with compacting stream data from chunks.

Operation 810 represents the compactor looking for an already existing map (or maps if multiple aggregation functions) in the system metadata for this chunk. If not there, operation 810 is performed to look for an already existing map(s) in the chunk header.

If the map exists in either location, then the chunk data need not be read and compacted as described above, whereby operation 814 reads the map/merges the map into the main map of the compactor. Operations 816 and 818 repeat the process until there are no more chunks to process, at which time the process branches to operation 1014 as described below if the tail part has been reached. Note that if the tail part has not been reached after the Tier-2 storage chunks have been compacted, and there are no more chunks to process (as evaluated at operation 816), the compaction operations instead continue at operation 902 of FIG. 9 to aggregate events from the remaining source part of data stream, which is in Tier-1 storage.

Returning to operation 812, if no per-chunk maps exist for this data stream, (because the number of routing keys was too great meaning the per-chunk maps were too large to pre-generate and store in association with the chunk), operation 812 branches to operation 902 of FIG. 9.

Operation 902 reads the first even to aggregate, and operation 904 selects the first aggregation function to use. Again, note that if having multiple simultaneous maps will be too large (e.g., as estimated from the number of routing keys) then less than all aggregation functions (as few as one) can be used per compaction run. In the example of FIG. 9, the ability to have multiple aggregation functions with corresponding maps in a single compaction run is described. Operation 906 locates the map corresponding to the currently selected aggregation function.

Operation 908 attempts to get the existing data value for the event's routing key from the map, e.g., using the routing key as an index (key) into the map (key-value) store. If the value does exist (it is existing aggregated data) as evaluated at operation 910 and is returned, operation 912 aggregates the event's data value with the routing key's existing aggregated data using the selected aggregation function. If the value does not exist, e.g., a NULL or similar indication was returned as evaluated at operation 910, operation 914 sets the initial aggregated value based on the event value and possibly the aggregation function; (e.g., in the example aggregation function where the event value is squared, the aggregation function squares the event value and sets the initial aggregated value to the result).

Operation 916 puts the updated aggregated value into the map, either as the initial value (obtained via operation 914) or by overwriting the previously existing aggregated value (obtained via operation 912). Operations 918 and 920 repeat the process using the next aggregation function (if any) and its corresponding map, until no aggregation functions remain for this event/data read. The process continues to operation 1002 of FIG. 10.

Operation 1002 of FIG. 10 reads the next routing key and event from the data stream. The process continues with the next event to be aggregated via the operations of FIG. 9 (starting from operation 904) as described above until the tail part is reached, as evaluated at operation 1004. Note that the source of the stream data does not ordinarily matter to the compactor at this time, only that the compactor reads the next event, aggregates its data value and so on, whether from a next chunk, or from Tier-1 storage, until the tail part is reached.

When the tail part is reached, operation 1006 selects the first map (there is only one per aggregation function, although each map can be a composite map for multiple segments as described herein), and operation 1008 creates the compacted stream from the map contents as described herein, which can be directly to Tier-2 storage. Operations 1010 and 1012 repeat the process if there was more than one aggregation function/map used during the compaction.

Operation 1014 represents associating the reader application(s) that are at or ahead of the tail part with the compacted stream, which can be a different stream (with a common tail part) per reader/aggregation function as described above with reference to FIG. 6.

Operation 1016 represents evaluating whether there is still a reader application (among the full set of reader applications registered to read this stream) that needs the source part of the data stream, that is, at least one reader application has not yet reached the tail part. If the source part is no longer needed, operation 1018 deletes and/or truncates the stream source part (deletes the chunks in the first part in Tier-2) (and truncates the second part, if any, in Tier-1). Note that deletion of old stream data is a straightforward and already implemented operation that (normally) includes deletion of demoted data at the chunk level and (optionally) truncation of a stream part that still resides in Tier-1. Instead of directly deleting and/or truncating the source part, the source part can be marked for actual chunk deletion/stream data truncation for another entity or entities to do at a later time.

Figure 11:
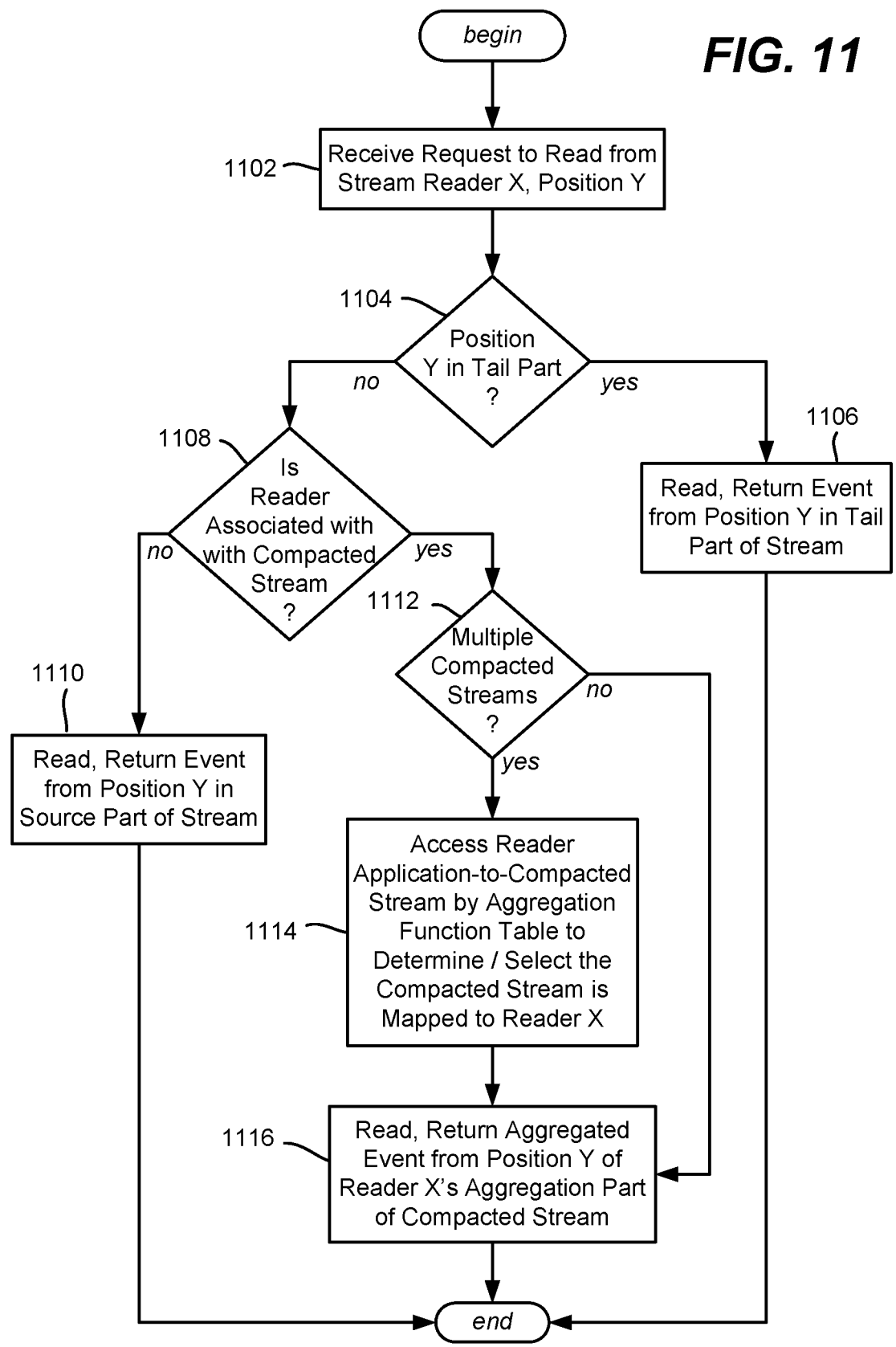
FIG. 11 is a flow diagram showing example operations related to handling a read request with respect to a compacted data stream, in accordance with various aspects and implementations of the subject disclosure.

FIG. 11 represents handling a data stream read request from a reader application X at stream position Y, as received at operation 1102. If operation 1104 determines the read is for the tail part, operation 1106 reads and returns the event for the tail part of the data stream. If not in the tail part, operation 1108 evaluates whether the reader is associated with a compacted stream. If not, (because the reader part has not reached the tail part (or the stream has not been compacted), then operation 1110 reads from the source part of the stream as described herein and returns the event in response to the read request.

If the reader is associated with a compacted stream, operation 112 evaluates whether there are multiple compacted streams (with different heads for different aggregation functions as described above with reference to FIG. 6). If so, operation 1114 determines which compacted stream is mapped to this reader X, and selects that compacted stream. Operation 1116 reads and returns the aggregated event from the compacted stream for the reader X.

Figure 12:
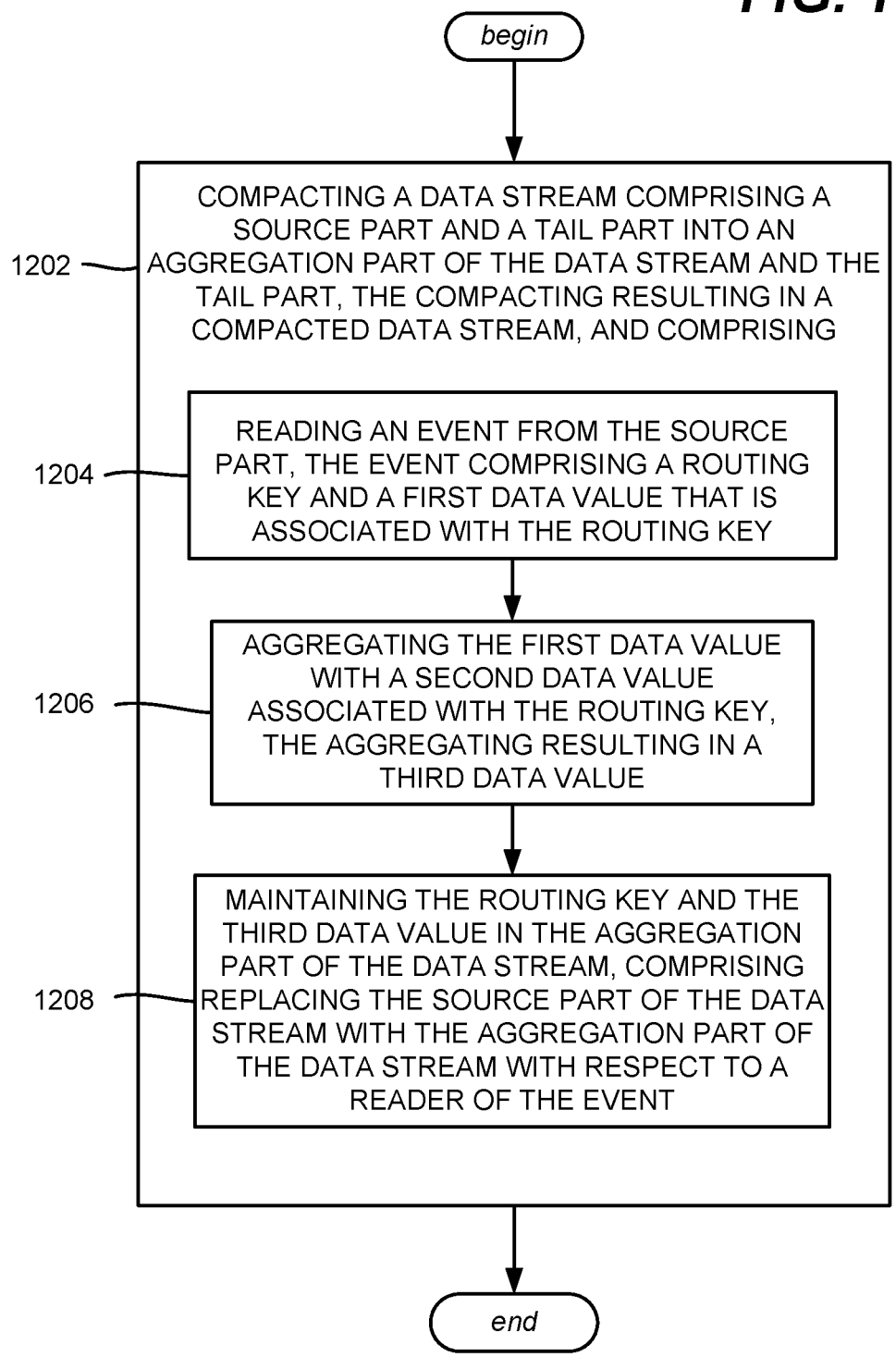
FIG. 12 is an example flow diagram showing example operations related to compacting a data stream by aggregating event data, in accordance with various aspects and implementations of the subject disclosure.

One or more aspects can be embodied in a system, such as represented in FIG. 12, and for example can comprise a memory that stores computer executable components and/or operations, and a processor that executes computer executable components and/or operations stored in the memory. Example operations can comprise operation 1202, which represents compacting a data stream comprising a source part and a tail part into an aggregation part of the data stream and the tail part, the compacting resulting in a compacted data stream. Operation 1202 can comprise operation 1204, which represents reading an event from the source part, the event comprising a routing key and a first data value that is associated with the routing key, operation 1206, which represents aggregating the first data value with a second data value associated with the routing key, the aggregating resulting in a third data value, and operation 1208, which represents maintaining the routing key and the third data value in the aggregation part of the data stream, comprising replacing the source part of the data stream with the aggregation part of the data stream with respect to a reader of the event.

Further operations can comprise receiving a request to read the event from the compacted data stream, which can also be based on the routing key, and returning the third data value from the aggregation part in response to the request.

Maintaining the routing key and the third data value in the aggregation part of the data stream operations can comprise accessing a data structure that comprises the routing key and the second data value among a group of routing keys and aggregated data value groupings, obtaining the second data value using the routing key as a key into the data structure, combining, based on an aggregation function, the second data value with the first data value into the third data value, and storing the third data value in association with the routing key in place of the second data value using the routing key as the key into the data structure; replacing the source part of the data stream with the aggregation part of the data stream can comprise writing the data structure to the aggregation part of the data stream. The data structure can correspond to a segment of the source part with which the routing key is associated, and writing the data structure to the aggregation part of the data stream operations can comprise writing to a counterpart segment in the aggregation part. Further operations can comprise determining the data structure and the counterpart segment based on a hash computation of the routing key.

Further operations can comprise reclaiming space of the source part of the data stream in response to determining that no reader application is going to read from the source part of the data stream.

The source part of the data stream can be maintained in tier-2 storage. A first part of the source part of the data stream can be maintained in tier-2 storage, and a second part of the source part of the data stream can be maintained in tier-1 storage.

The aggregation part of the data stream can be a first aggregation part, aggregating the first data value with the second data value can comprises combining, based on a first aggregation function, the second data value with the first data value into the third data value, the reader of the event can be a first reader associated with the first aggregation function, and further operations can comprise combining, based on a second aggregation function, information based on the second data value with the first data value into a fourth data value, and maintaining the routing key and the fourth data value in a second aggregation part of the data stream, comprising replacing the source part of the data stream with the second aggregation part of the data stream with respect to a second reader of the event, the second reader being associated with the second aggregation function.

Further operations can comprise obtaining the second data value based on information maintained in system chunk metadata.

Further operations can comprise obtaining the second data value based on information maintained in a chunk header.

Figure 13:
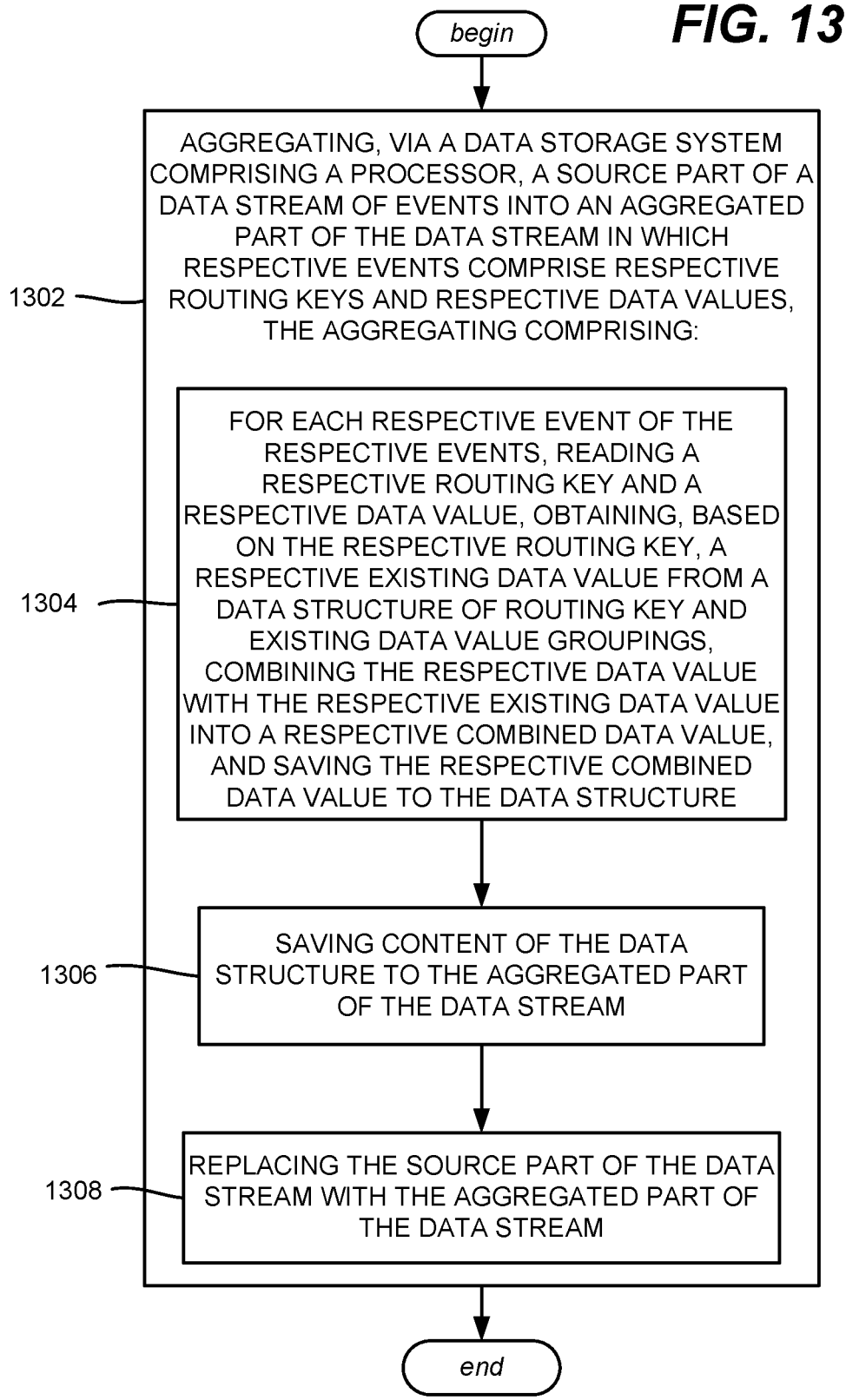
FIG. 13 is an example flow diagram showing example operations related to aggregating a source part of a data stream to produce an aggregated part of the data stream, in accordance with various aspects and implementations of the subject disclosure.

One or more example aspects, such as corresponding to example operations of a method, are represented in FIG. 13. Operation 1302 represents aggregating, via a data storage system comprising a processor, a source part of a data stream of events into an aggregated part of the data stream in which respective events comprise respective routing keys and respective data values. The aggregating can comprise, for each respective event of the respective events, reading a respective routing key and a respective data value, obtaining, based on the respective routing key, a respective existing data value from a data structure of routing key and existing data value groupings, combining the respective data value with the respective existing data value into a respective combined data value, and saving the respective combined data value to the data structure (operation 1304), saving content of the data structure to the aggregated part of the data stream (operation 1306), and replacing the source part of the data stream with the aggregated part of the data stream (operation 1308).

Aspects can comprise receiving a request to read an event from the aggregated part of the data stream, the request comprising a routing key, locating the event in a segment based on the routing key, the event comprising a combined data value, and returning the combined data value in response to the request.

Combining the respective data value with the respective existing data value can comprise using a specified aggregation function to perform the combining.

Replacing the source part of the data stream with the aggregated part of the data stream can correspond to a first request from a first reader; aspects can comprise receiving a second request to read an event from the source part of the data stream from a second reader, (the second request can comprise a routing key), and, in response to the request (and possibly based on the routing key), reading a data value of the event from the source part of the data stream, and returning the data value to the second reader.

Figure 14:
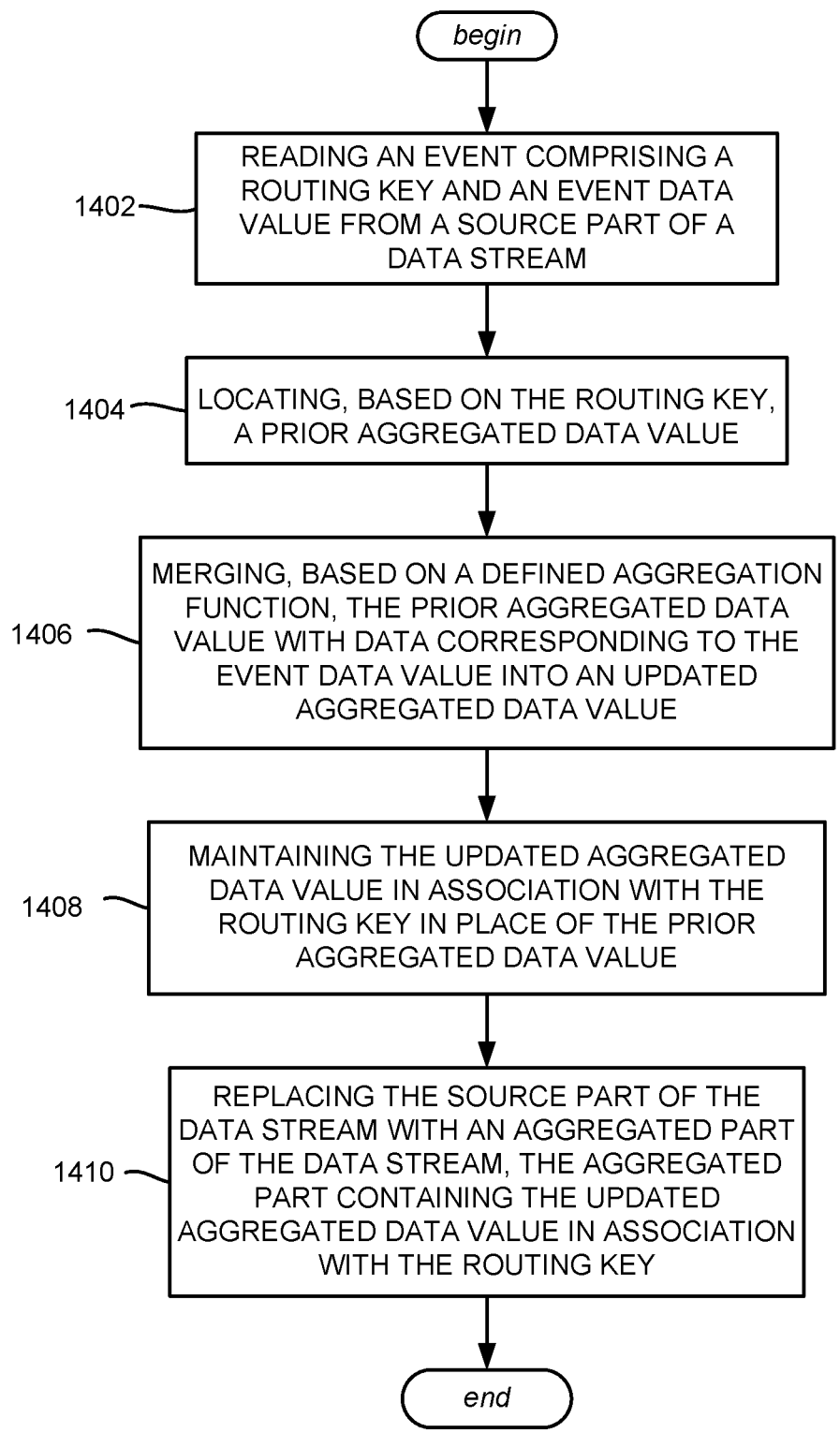
FIG. 14 is an example flow diagram showing example operations related to merging a data stream event's data value with a prior aggregated data value to provide an updated aggregated data value, in accordance with various aspects and implementations of the subject disclosure.

FIG. 14 summarizes various example operations, e.g., corresponding to a machine-readable storage medium, comprising executable instructions that, when executed by a processor of a streaming data storage system, facilitate performance of operations. Operation 1402 represents reading an event comprising a routing key and an event data value from a source part of a data stream. Operation 1404 represents locating, based on the routing key, a prior aggregated data value. Operation 1406 represents merging, based on a defined aggregation function, the prior aggregated data value with data corresponding to the event data value into an updated aggregated data value. Operation 1408 represents maintaining the updated aggregated data value in association with the routing key in place of the prior aggregated data value. Operation 1410 represents replacing the source part of the data stream with an aggregated part of the data stream, the aggregated part containing the updated aggregated data value in association with the routing key.

Further operations can comprise deleting the source part of the data stream.

Further operations can comprise obtaining the prior aggregated data value from a data structure; the data structure can comprise routing key, aggregated data value pairs, and maintaining the updated aggregated data value in association with the routing key in place of the prior aggregated data value can comprise overwriting the prior aggregated data value in the data structure with the updated aggregated data value.

The aggregated part of the data stream can correspond to a first reader, the source part of the data stream can correspond to a second reader, and further operations can comprise receiving a read request to read the event, determining whether the read request is for the event in a tail part of the data stream, in response to determining that the read request is for the event in the tail part of the data stream, reading the event from the tail part of the data stream, in response to determining that the read request is not for the event in the tail part of the data stream, determining whether the read request is from the first reader or the second reader, in response to determining that the read request is from the first reader, reading the event from the aggregated part of the data stream, in response to determining that the read request is from the second reader, reading the event from the source part of the data stream, and returning a data value of the event in response to the read request.

The defined aggregation function can be a first defined aggregation function, the prior aggregated data value can be a first prior aggregated data value, and further operations can comprise locating, based on the routing key, a second prior aggregated data value associated with a second defined aggregation function, merging, based on the second defined aggregation function, the second prior aggregated data value with data corresponding to the event data value into a second updated aggregated data value, and maintaining the second updated aggregated data value in association with the routing key in place of the second prior aggregated data value.

As can be seen, described herein is a technology that facilitates the use of aggregated stream data as part of a compacted data stream. The technology works with data streams having multiple segments, different reader applications at different positons in the data stream, and multiple different aggregation functions. The technology facilitates more optimal compaction for a data stream with a lesser number of routing keys by maintaining per-chunk aggregation data for such data streams.

Figure 15:
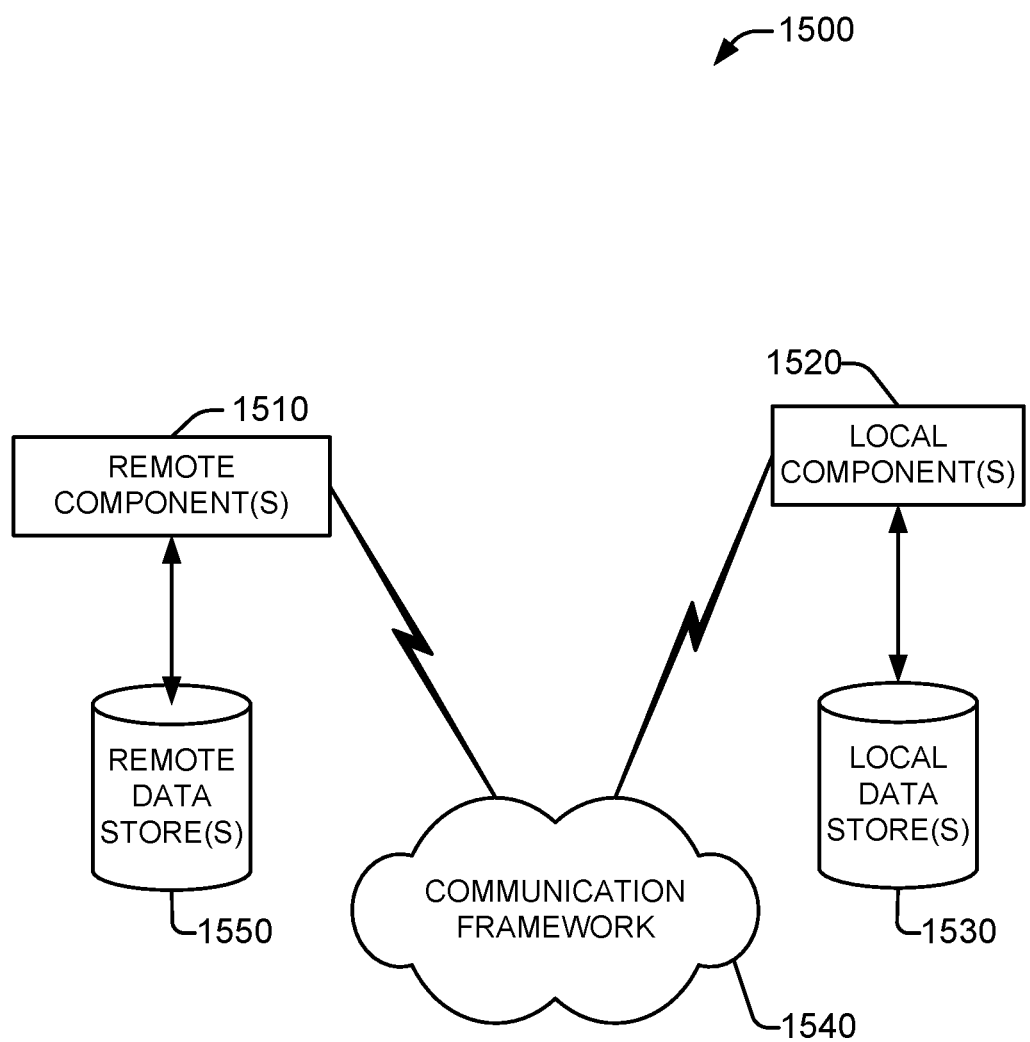
FIG. 15 is a block diagram representing an example computing environment into which aspects of the subject matter described herein may be incorporated.

FIG. 15 is a schematic block diagram of a computing environment 1500 with which the disclosed subject matter can interact. The system 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The system 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Figure 16:
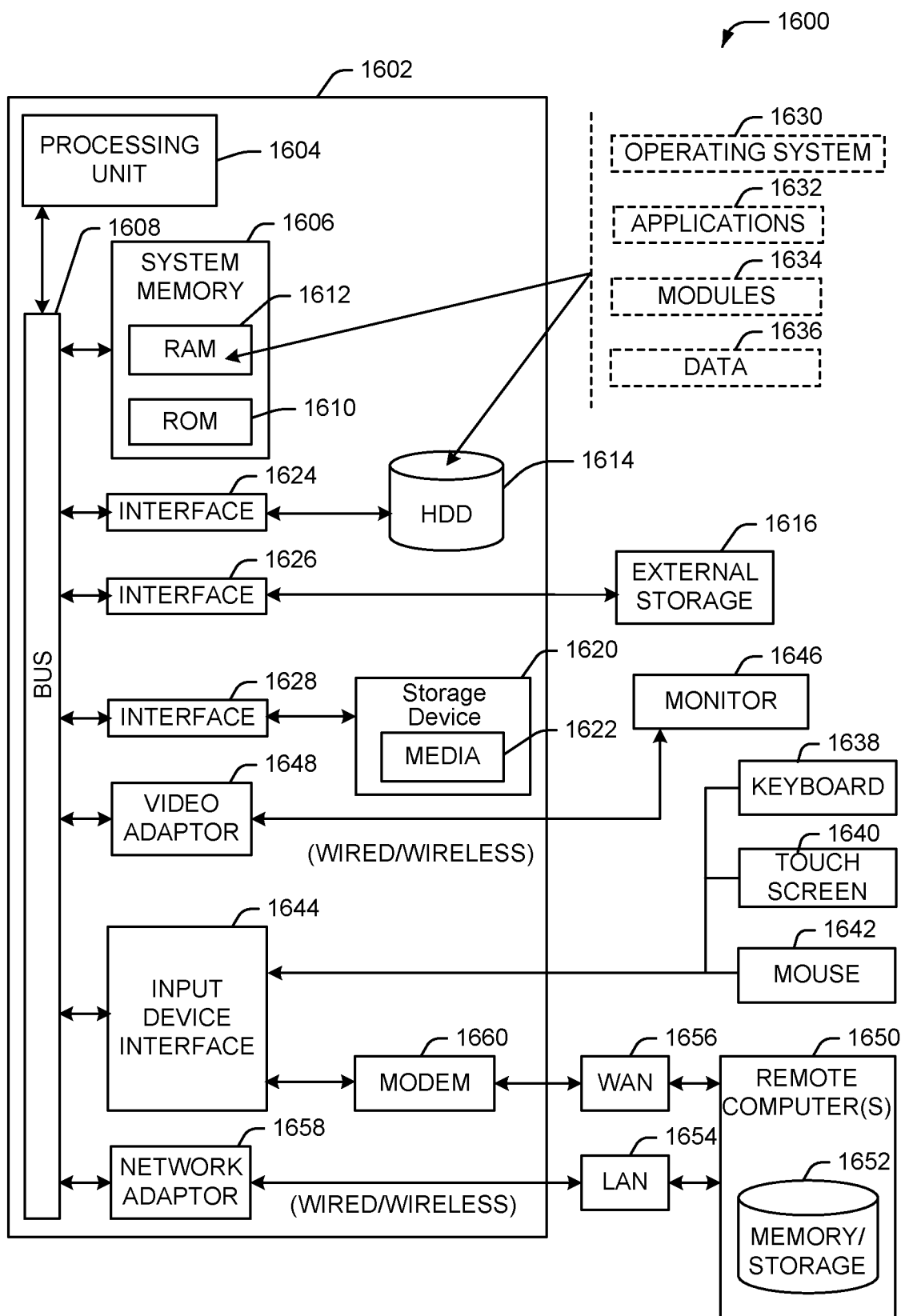
FIG. 16 depicts an example schematic block diagram of a computing environment with which the disclosed subject matter can interact/be implemented at least in part, in accordance with various aspects and implementations of the subject disclosure.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), and can include one or more external storage devices 1616 (e.g., a magnetic floppy disk drive (FDD) 1616, a memory stick or flash drive reader, a memory card reader, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614.

Other internal or external storage can include at least one other storage device 1620 with storage media 1622 (e.g., a solid state storage device, a nonvolatile memory device, and/or an optical disk drive that can read or write from removable media such as a CD-ROM disc, a DVD, a BD, etc.). The external storage 1616 can be facilitated by a network virtual machine. The HDD 1614, external storage device(s) 1616 and storage device (e.g., drive) 1620 can be connected to the system bus 1608 by an HDD interface 1624, an external storage interface 1626 and a drive interface 1628, respectively.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1594 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   compacting a data stream comprising a source part and a tail part into an aggregation part of the data stream and the tail part of the data stream, the compacting resulting in a compacted data stream, and comprising:
   reading an event from the source part, the event comprising a routing key and a first data value that is associated with the routing key;
   aggregating the first data value with a second data value associated with the routing key, the aggregating resulting in a third data value; and
   maintaining the routing key and the third data value in the aggregation part of the data stream, comprising replacing the source part of the data stream with the aggregation part of the data stream with respect to a reader of the event.

2. The system of claim 1, wherein the operations further comprise receiving a request to read the event from the compacted data stream, and returning the third data value from the aggregation part in response to the request.

3. The system of claim 1, wherein the maintaining the routing key and the third data value in the aggregation part of the data stream comprises:
   accessing a data structure that comprises the routing key and the second data value among a group of routing keys and aggregated data value groupings,
   obtaining the second data value using the routing key as a key into the data structure,
   combining, based on an aggregation function, the second data value with the first data value into the third data value,
   storing the third data value in association with the routing key in place of the second data value using the routing key as the key into the data structure, and
   wherein the replacing the source part of the data stream with the aggregation part of the data stream comprises writing the data structure to the aggregation part of the data stream.

4. The system of claim 3, wherein the data structure corresponds to a segment of the source part with which the routing key is associated, and wherein the writing the data structure to the aggregation part of the data stream comprises writing to a counterpart segment in the aggregation part.

5. The system of claim 4, wherein the operations further comprise determining the data structure and the counterpart segment based on a hash computation of the routing key.

6. The system of claim 1, wherein the operations further comprise reclaiming space of the source part of the data stream in response to determining that no reader application is going to read from the source part of the data stream.

7. The system of claim 1, wherein the source part of the data stream is maintained in tier-2 storage.

8. The system of claim 1, wherein a first part of the source part of the data stream is maintained in tier-2 storage, and wherein a second part of the source part of the data stream is maintained in tier-1 storage.

9. The system of claim 1, wherein the aggregation part of the data stream is a first aggregation part, wherein the aggregating the first data value with the second data value comprises combining, based on a first aggregation function, the second data value with the first data value into the third data value, wherein the reader of the event is a first reader associated with the first aggregation function, and wherein the operations further comprise, combining, based on a second aggregation function, information based on the second data value with the first data value into a fourth data value, and maintaining the routing key and the fourth data value in a second aggregation part of the data stream, comprising replacing the source part of the data stream with the second aggregation part of the data stream with respect to a second reader of the event, the second reader being associated with the second aggregation function.

10. The system of claim 1, wherein the operations further comprise obtaining the second data value based on information maintained in system chunk metadata.

11. The system of claim 1, wherein the operations further comprise obtaining the second data value based on information maintained in a chunk header.

12. A method, comprising:
aggregating, via a data storage system comprising a processor, a source part of a data stream of events into an aggregated part of the data stream in which respective events comprise respective routing keys and respective data values, the aggregating comprising:
for each respective event of the respective events, reading a respective routing key and a respective data value, obtaining, based on the respective routing key, a respective existing data value from a data structure of routing key and existing data value groupings, combining the respective data value with the respective existing data value into a respective combined data value, and saving the respective combined data value to the data structure;
saving content of the data structure to the aggregated part of the data stream; and
replacing the source part of the data stream with the aggregated part of the data stream.

13. The method of claim 12, further comprising, receiving a request to read an event from the aggregated part of the data stream, the request comprising a routing key, locating the event in a segment based on the routing key, the event comprising a combined data value, and returning the combined data value in response to the request.

14. The method of claim 12, wherein the combining the respective data value with the respective existing data value comprises using a specified aggregation function to perform the combining.

15. The method of claim 12, wherein the replacing the source part of the data stream with the aggregated part of the data stream corresponds to a first request from a first reader, and further comprising, receiving a second request to read an event from the source part of the data stream from a second reader, and, in response to the request, reading a data value of the event from the source part of the data stream, and returning the data value to the second reader.

16. A non-transitory machine-readable medium, comprising executable instructions that, when executed by a processor of a streaming data storage system, facilitate performance of operations, the operations comprising:
reading an event comprising a routing key and an event data value from a source part of a data stream;
locating, based on the routing key, a prior aggregated data value;
merging, based on a defined aggregation function, the prior aggregated data value with data corresponding to the event data value into an updated aggregated data value;
maintaining the updated aggregated data value in association with the routing key in place of the prior aggregated data value; and
replacing the source part of the data stream with an aggregated part of the data stream, the aggregated part containing the updated aggregated data value in association with the routing key.

17. The non-transitory machine-readable medium of claim 16, wherein the operations further comprise deleting the source part of the data stream.

18. The non-transitory machine-readable medium of claim 16, wherein the operations further comprise obtaining the prior aggregated data value from a data structure, wherein the data structure comprises routing key, aggregated data value pairs, and wherein the maintaining the updated aggregated data value in association with the routing key in place of the prior aggregated data value comprises overwriting the prior aggregated data value in the data structure with the updated aggregated data value.

19. The non-transitory machine-readable medium of claim 16, wherein the aggregated part of the data stream corresponds to a first reader, wherein the source part of the data stream corresponds to a second reader, and wherein the operations further comprise,
receiving a read request to read the event;
determining whether the read request is for the event in a tail part of the data stream,
in response to determining that the read request is for the event in the tail part of the data stream, reading the event from the tail part of the data stream;
in response to determining that the read request is not for the event in the tail part of the data stream, determining whether the read request is from the first reader or the second reader;
in response to determining that the read request is from the first reader, reading the event from the aggregated part of the data stream;
in response to determining that the read request is from the second reader, reading the event from the source part of the data stream; and
returning a data value of the event in response to the read request.

20. The non-transitory machine-readable medium of claim 16, wherein the defined aggregation function is a first defined aggregation function, wherein the prior aggregated data value is a first prior aggregated data value, and wherein the operations further comprise:
locating, based on the routing key, a second prior aggregated data value associated with a second defined aggregation function,
merging, based on the second defined aggregation function, the second prior aggregated data value with data corresponding to the event data value into a second updated aggregated data value, and
maintaining the second updated aggregated data value in association with the routing key in place of the second prior aggregated data value.

\* \* \* \* \*